Jan. 4, 1966 W. J. HARLEY 3,226,994
VEHICLE TRANSMISSION AND CONTROL
Original Filed July 28, 1961 3 Sheets-Sheet 1

INVENTOR.
WILLIAM J. HARLEY
BY
ATTORNEY

INVENTOR.
WILLIAM J. HARLEY
BY
ATTORNEY

INVENTOR.
WILLIAM J. HARLEY
BY
ATTORNEY

United States Patent Office 3,226,994
Patented Jan. 4, 1966

3,226,994
VEHICLE TRANSMISSION AND CONTROL
William J. Harley, Milwaukee, Wis., assignor to Harley-Davidson Motor Co., Milwaukee, Wis., a corporation of Wisconsin
Original application July 28, 1961, Ser. No. 127,605, now Patent No. 3,144,860, dated Aug. 18, 1964. Divided and this application Mar. 26, 1964, Ser. No. 354,926
2 Claims. (Cl. 74—230.17)

This invention relates to a variable speed transmission which can act to govern the input under certain operating conditions. This application is a division of application Serial No. 127,605; filed July 28, 1961, now Patent No. 3,144,860.

Patent No. 2,986,043 shows a transmission designed for use in connection with a motor scooter or the like and employing a variable diameter sheave connected to a driven sheave by means of a V-belt. The driven sheave is spring loaded to a maximum diameter position and the drive sheave is spring loaded to a minimum diameter position while being provided with a number of balls movable outwardly to increase the effective diameter of the drive sheave as the input speed is increased with a consequent increase in centrifugal force acting on the balls. As a part of the control apparatus for the motor scooter the patent provided a selector lever having basically two positions, one being the "start" position and the other being a "run" position. In the running position the motor starter cord is locked against actuation so that the scooter cannot be started "in gear." The transmission in that patent was so connected to the selector lever that when the selector lever was moved to the "start" position a plurality of fingers or pins were moved into the path of the centrifugally operated balls to prevent them moving outwardly under influence of centrifugal force. Under this condition when the scooter was started the drive sheave was locked in its minimum diameter position and, hence, the input speed to the drive sheave could not be transmitted to the rear wheel of the motor scooter. It will be appreciated that this system apparently affords an effective safety interlock for the starting condition. One factor overlooked in such a design is that of the human element and experience has shown that in a number of cases the operator of the scooter was desirous of increasing the engine speed with the selector in the start or neutral position. This enabled the operator to produce a considerable amount of noise which for psychological reasons was rather satisfactory to some persons. From an engineering standpoint, however, the results were frequently rather disastrous in that the great increase in engine speed with no load on the engine would produce considerable centrifugal force on the balls which, of course, was resisted by the pins holding the balls against outward movement. Under such circumstances it will be appreciated that something had to give, either the engine or the pins, and generally it was the pins which would be bent or sheared and permit the balls to fly outwardly and destroy the input part of the transmission.

The principal object of this invention is to improve upon the foregoing transmission to prevent application of such runaway speed conditions to the input of the transmission.

This object has been accomplished by interlocking the selector lever with the driven portion of the transmission to lock the driven portion of the transmission against rotation when the selector is in the start or neutral position. The drive portion is no longer provided with the restraining pins and is free to change the effective diameter of the drive sheave in response to input speed. This being the case, any attempt to unduly "rev up" the engine when in the start or neutral position will necessarily result in attempting to drive the output through the V-belt. Now, since the output is locked against rotation it becomes obvious that the V-belt will be subjected to considerable slippage while at the same time acting as a very effective brake on the engine and thus limiting the engine speed. About the most that can happen under these conditions is to accelerate wear of the V-belt which is an inexpensive and easily replaced part. It is extremely unlikely, however, that any damage will be done to the transmission itself and, hence, it is extremely unlikely that the operator can be injured in any way by a transmission being blown apart as was possible in connection with the prior transmission.

Other objects and advantages will be pointed out in, or be apparent from, the specification and claims, as will obvious modifications of the single embodiment shown in the drawings, in which:

Figure 1:
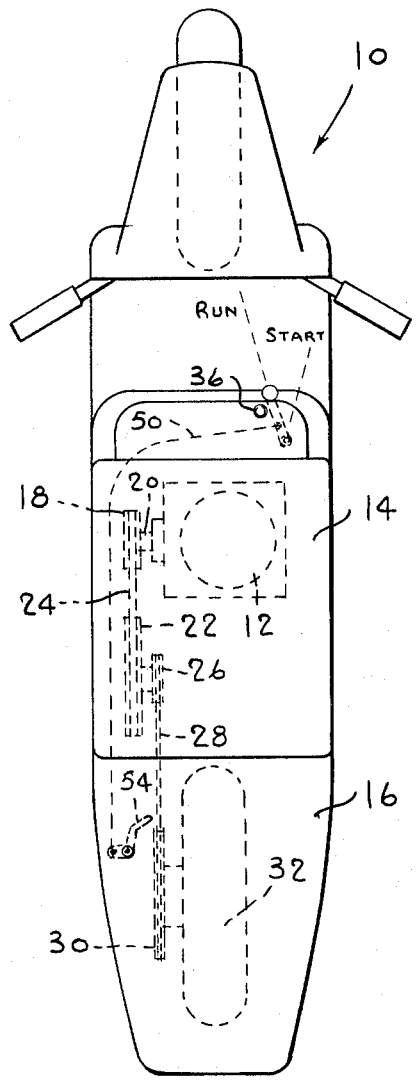
FIG. 1 is a top view of a motor scooter with the motor and transmission system shown dotted.

Referring to the drawings, in detail, motor scooter 10 has an engine 12 mounted under seat 14 on top of body 16. Speed responsive variable diameter sheave 18 is mounted on the motor or engine drive shaft 20 and drives a spring loaded variable diameter driven sheave 22 to V-belt 24. The driven sheave is mounted on a jack-shaft for rotation at a speed determined by the effective diameter of the drive sheave 18. A drive sprocket 26 is connected by chain 28 to the driven sprocket 30 which in turn is connected to the rear wheel 32. The vehicle is provided with a suitable throttle control.

Figure 5:
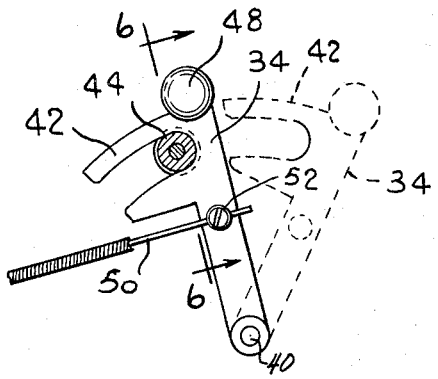
FIG. 5 is a view of the selector lever.
Figure 6:
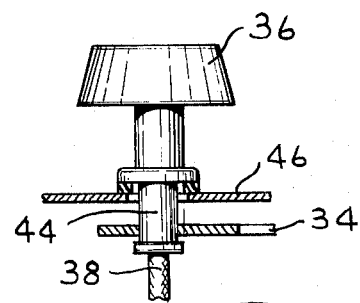
FIG. 6 is a view of the starter knob.
Figure 7:
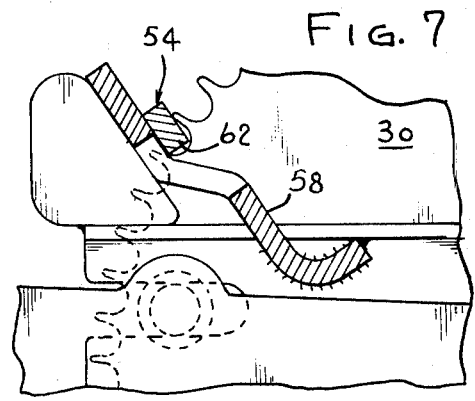
FIG. 7 is a section view of the bell crank engaged with the sprocket.

Mounted in front of and below the seat 14 is a selector level movable between "run" position and "start" position. FIGS. 1, 5 and 6 illustrate the "run" position with the "start" position being indicated in dotted lines in FIG. 5. In the "run" position the selector lever 34 prevents actuation of the engine starter cable by preventing movement of knob 36 connected to the start cable 38. Lever 34 is pivoted at 40 and is provided with a slotted end portion 42 which, in the "run" position shown in full lines in FIG. 5, engages the reduced diameter portion 44 of the start knob below the body panel 46.

Figure 4:
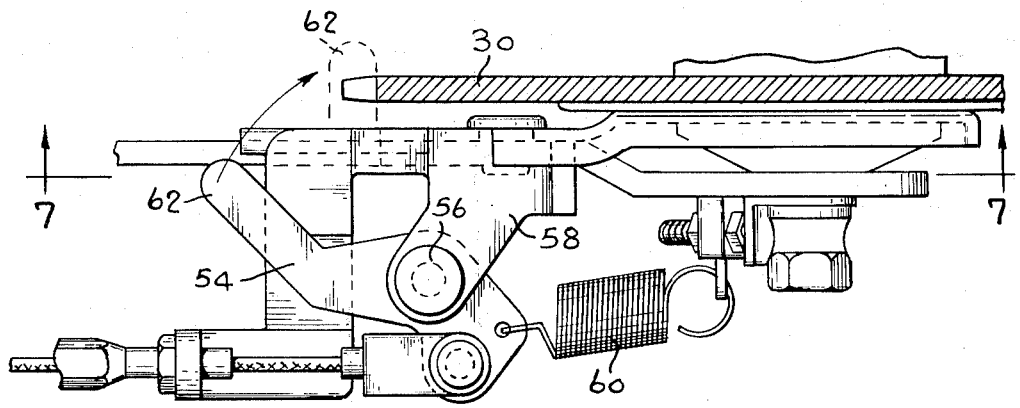
FIG. 4 is a top view of the lockout mechanism.

When the selector knob 48 is moved to move lever 34 to the "start" position as illustrated in dotted lines in FIG. 5 the slot in the selector lever is withdrawn from the reduced portion 44 of the starter knob and, hence, the knob is free to be actuated. It will be noted that push-pull cable 50 is connected to the selector level at 52. The other end of this cable is connected to a spring loaded bell crank 54 adjacent the driven sprocket (at the rear wheel). The bell crank is pivoted at 56 on bracket 58 and is biased by spring 60 into the position shown in FIGS. 1 and 4. Movement of the selector lever to the "start" position will, however, rotate the bell crank 54 in the direction of the arrow in FIG. 4 to move the dog portion 62 of the crank into engagement with the driven sprocket 30. If the dog is not lined up with a space between the sprocket teeth there is sufficient play to permit the dog to "find" a suitable notch portion by riding down one side or the other of a tooth or it is possible to "find" the notch by rocking the scooter.

From the foregoing it will be appreciated that when the starter knob is free for actuation the rear wheel of the motor scooter is locked against rotation. Since the rear wheel is locked against rotation the drive sprocket 26 rotatable with the driven sheave 22 will also be locked against rotation and, hence, the driven sheave is locked against rotation. Therefore, in the "start" position the driven sheave is in its maximum diameter position.

Figure 2:
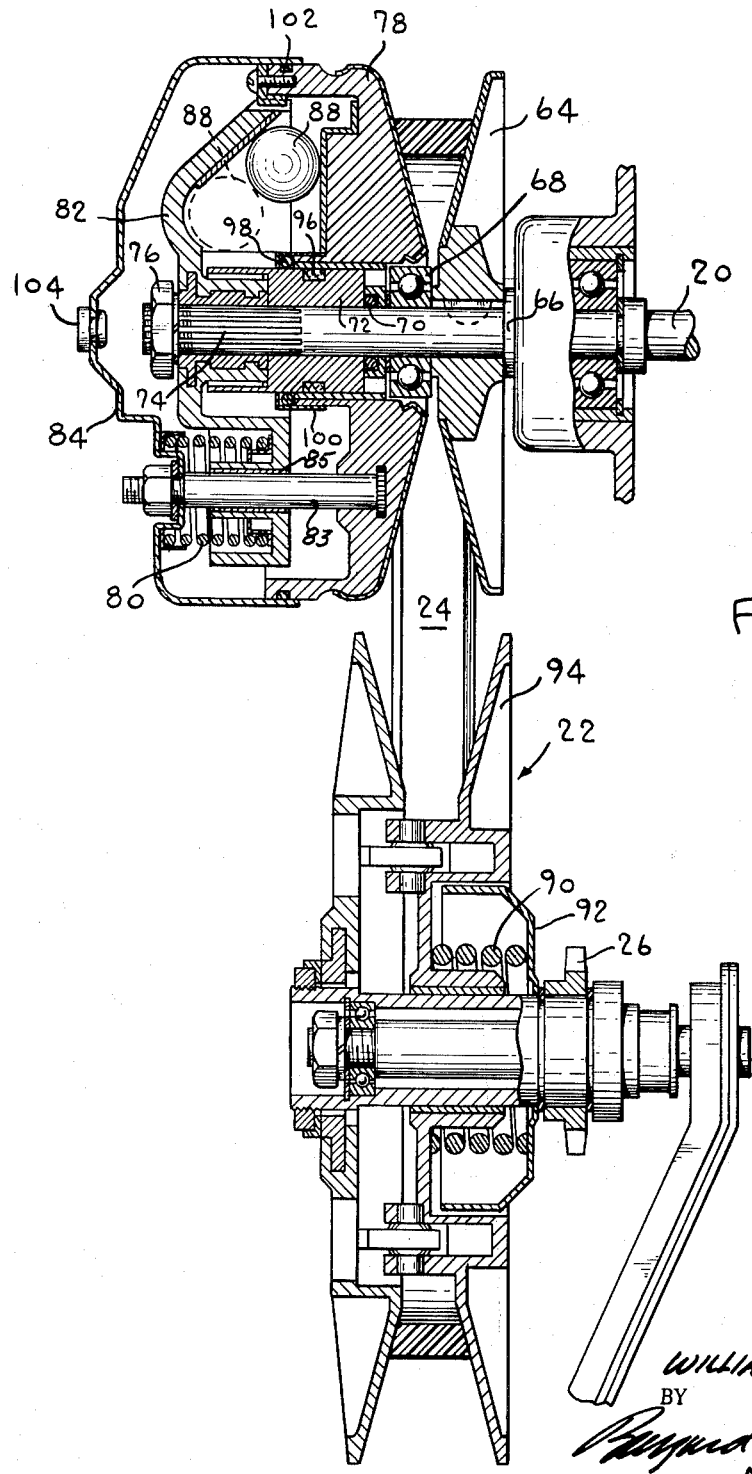
FIG. 2 is a sectional view of the variable ratio power transmission.
Figure 3:
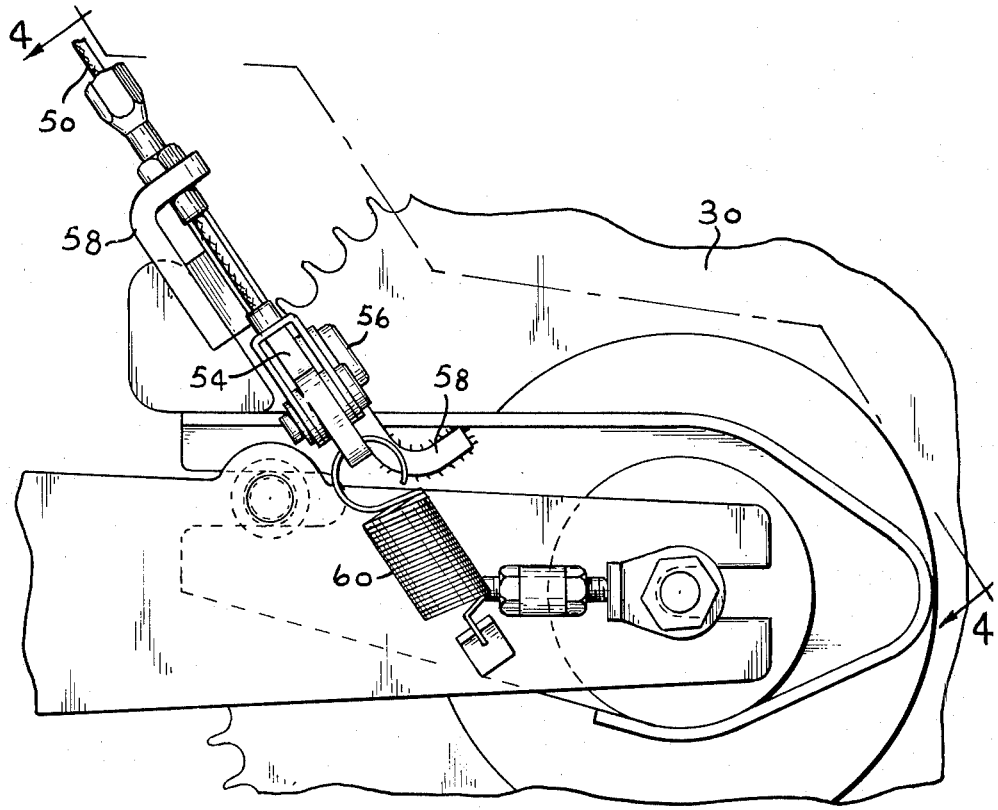
FIG. 3 is a side view of the bell crank lockout mechanism.

Going now to the details of the drive and driven sheaves, the engine drive shaft 20 has a sheave half 64 keyed thereon and fixed axially by reason of its position between shaft collar 66 and the combined assembly of the ball bearing assembly 68, O-ring shaft seal assembly 70, spacer bushing 72 and drive element 82 splined on the shaft and retained thereon by nut 76. The movable sheave half 78 slides on the bushing 72 and is biased to the left in FIG. 2 by a plurality of springs 80 compressed between drive member 82 fixed on spline 74 and the cover 84 fixed to the sheave half. The spring load on the sheave half 78 acts to move the balls 88 to their innermost position. The balls engage grooved bronze raceways on both the sheave half 78 and on the dished drive member 82. Power is transmitted from the drive member 82 to the sheave half 78 through drive pins 83 fixed in sheave half 78 and bushed in drive member 82 at 85. As the engine speed is increased centrifugal force will force the balls outwardly against the bias of springs 80 to move sheave half 78 to the right and increase the effective diameter of the drive sheave. This, of course, will cause a corresponding decrease in the diameter of the driven sheave 22 which is biased by spring 90 compressed between fixed member 92 and the movable sheave half 94. When the engine speed is low the spring load on the drive sheave will act to reduce the drive sheave diameter to a minimum with the V-belt then riding on the outer race of bearing assembly 68. This is the normal "start" condition.

In starting and idling the engine the drive sheave diameter is the minimum and there is, of course, no motion transmitted to the driven sheave. In the "start" position of the selector lever the whole output portion of the transmission is locked against motion and under these conditions it will be appreciated that increasing the engine speed will tend to increase the effective diameter of the drive sheave and start pinching the V-belt. Since the driven sheave cannot rotate there will be considerable slippage and, of course, considerable braking effect at the drive sheave. This will prevent excessive engine sped and permits use of an ungoverned engine in the motor scooter and no damage can occur in the drive sheave since the excessive slippage on the V-belt will manifest itself as damage to the V-belt and not to the drive sheave. After the operator has worn out a V-belt or so he will soon tire of attempting to "rev up" his engine for purposes of demonstration and the like.

When the selector lever is moved to the drive or run position the spring 60 acting on crank 54 will insure moving the dog out of engagement with the sprocket and the spring then acts to prevent the dog from being jarred into engagement with the sprocket. The spring acts as a safety measure should the cable break.

With the present construction and avoidance of any mechanism preventing movement of the balls under certain conditions it is now possible to provide a very effective dirt and oil seal for the drive sheave. Thus, there is the shaft seal 70 preventing leakage at this point, dust seal 96, and an O-ring 98 held in place by retainer 100. On the outside of the assembly there is an additional O-ring 102 acting between cover 84 and the movable sheave half 78 (it will be understood that there is no motion between parts 78 and 84). With such an effective seal of the assembly virtually no dirt can enter the ball raceways to shorten the life thereof. Lubricant can be added through the fill hole in the cover 84 which is normally plugged by the deformable rubber plug 104.

A further advantage of the present arrangement is that when the engine is to be started the rear wheel is locked and there is no possibility of the scooter moving (rolling) during starting.

Although but one embodiment of the present invention has been illustrated and described, it will be apparent to those skilled in the art that various changes and modifications may be made therein without departing from the spirit of the invention or from the scope of the appended claims.

I claim:

1. A speed responsive variable diameter sheave assembly comprising, a shaft, a sheave half fixed on the shaft, a sheave half axially movable on the shaft to vary the spacing between the halves and, hence, the effective diameter, a member fixed on the shaft and cooperating with the movable sheave half to define an outwardly converging space, a weight disposed in the space and movable outwardly under influence of centrifugal force to move the movable sheave half towards the fixed sheave half, a cover housing carried by the movable sheave half and enclosing the fixed member, a drive pin interconnecting the movable sheave half and the housing and passing through the fixed member, and a spring coiled on the pin.

2. A variable diameter speed responsive sheave assembly comprising, a shaft, a sheave half fixed on the shaft, a sheave half axially movable on the shaft to vary the spacing between the halves, a member fixed on the shaft and cooperating with the movable sheave half to define an outwardly converging space, a weight disposed in the space movable outwardly under the influence of centrifugal force to move the movable sheave half towards the fixed sheave half, a housing carried by the movable sheave half and enclosing the fixed member, a drive pin interconnecting the housing and the movable sheave half and passing through said member, bearing means between said drive pin and the member to permit sliding motion of the drive pin with respect to the member, said pin acting to transmit the driving force from the movable sheave half to said shaft, a spring compressed between the member and the housing to exert a force on the movable sheave half in opposition to centrifugal force acting on the weight.

References Cited by the Examiner

UNITED STATES PATENTS

| | | | |
|---|---|---|---|
| 2,395,625 | 2/1946 | Heyer | 74—230.17 |
| 2,521,457 | 9/1950 | Heyer | 74—230.17 |
| 2,612,055 | 9/1952 | Miner | 74—230.17 |
| 2,678,566 | 5/1954 | Oehrli | 74—230.17 |
| 2,986,043 | 5/1961 | Jaulmes | 74—230.17 |
| 2,987,934 | 6/1961 | Thomas | 74—230.17 |

DAVID J. WILLIAMOWSKY, *Primary Examiner.*

DON A. WAITE, J. A. WONG, *Examiners.*